(12) United States Patent
Jones et al.

(10) Patent No.: US 11,484,961 B1
(45) Date of Patent: Nov. 1, 2022

(54) FITTINGS FOR ORBITALLY WELDED FUSION BONDS

(71) Applicant: Critical Systems, Inc., Boise, ID (US)

(72) Inventors: Theodore J Jones, Boise, ID (US); Ralph Vorraro, Boise, ID (US); Joshua Gene-Phillip Belke, Boise, ID (US); Nicholas Lee Bramon, Boise, ID (US)

(73) Assignee: Critical Systems, Inc., Boise, ID (US)

( * ) Notice: Subject to any disclaimer, the term of this patent is extended or adjusted under 35 U.S.C. 154(b) by 0 days.

(21) Appl. No.: 17/673,642

(22) Filed: Feb. 16, 2022

(51) Int. Cl.
| | |
|---|---|
| *B23K 9/235* | (2006.01) |
| *B23K 9/028* | (2006.01) |
| *B23K 9/00* | (2006.01) |
| *B23K 9/095* | (2006.01) |
| *B23K 101/10* | (2006.01) |
| *B23K 103/12* | (2006.01) |

(52) U.S. Cl.
CPC ............ *B23K 9/235* (2013.01); *B23K 9/0026* (2013.01); *B23K 9/0286* (2013.01); *B23K 9/0288* (2013.01); *B23K 9/0956* (2013.01); *B23K 2101/10* (2018.08); *B23K 2103/12* (2018.08)

(58) Field of Classification Search
CPC .. B23K 9/0286; B23K 9/0956; B23K 37/027; B23K 37/0276; B23K 37/0282; B23K 37/0288; B23K 2101/06
See application file for complete search history.

(56) References Cited

U.S. PATENT DOCUMENTS

| | | | | |
|---|---|---|---|---|
| 2004/0217096 | A1* | 11/2004 | Lipnevicius | B23K 37/0538 219/125.11 |
| 2018/0029154 | A1* | 2/2018 | Rajagopalan | B23K 37/0531 |
| 2019/0193180 | A1* | 6/2019 | Troyer | B23K 9/295 |
| 2020/0122259 | A1* | 4/2020 | Bowers | B23K 9/035 |
| 2021/0053135 | A1* | 2/2021 | Jones | B23K 9/16 |
| 2021/0402500 | A1* | 12/2021 | Gilad | B23K 31/125 |

* cited by examiner

*Primary Examiner* — Brian W Jennison

(74) *Attorney, Agent, or Firm* — FisherBroyles, LLP

(57) ABSTRACT

Embodiments are directed to methods, systems, and apparatuses, for providing fittings capable of being orbitally welded. A system may include measuring components configured to measure a tubing thickness and measure a fitting thickness. The system may also include a processor configured to determine a difference in thickness between the measured tubing thickness and the measured fitting thickness and, based on the determined difference in thickness, determine an amount of fitting that is to be removed to reach a set, specified thickness that allows the fitting to be orbitally welded. The system may also include a facing tool configured to bevel and shape an end portion of the fitting according to the determined amount of fitting that is to be removed to reach the specified thickness and may include an orbital welder configured to orbitally weld the beveled end of the fitting to the tubing in a fusion socket weld.

20 Claims, 9 Drawing Sheets

FITTINGS FOR ORBITALLY WELDED FUSION BONDS

BACKGROUND

Fittings are widely used in industry to join sections of pipe or tubing. For instance, an elbow fitting may join two sections of tubing that are 90 degrees offset to each other, a full coupling fitting may join sections of tubing that are directly opposed to each other, and a cross fitting may join four different sections of tubing, each at a 90-degree offset. These various types of fittings are manufactured in a relatively loose manner, with high tolerances for variations in wall thickness. These fittings may have a finished end that removes roughness or burring that may occur during manufacture. The high tolerances are typically beneficial for fittings, as they allow for annular gaps between the tubing and the fittings. These annular gaps are then filled with a filler metal when the tubing is joined to the fitting in a welding or brazing process. The filler material (e.g., alloys such as aluminum-silicon, copper-silver, copper-zinc, nickel alloys, etc.) may then bond the tubing to the fitting through capillary attraction once a sufficient amount of heat has been applied. These annular gaps, however, may not be desirable when joining specific types of tubing, or sections of tubing made from certain materials such as copper.

BRIEF SUMMARY

The embodiments described herein are directed to methods and apparatuses for providing fittings that are configured for orbitally welded fusion bonds. In one embodiment, a method of manufacturing may include measuring a tubing thickness of at least a portion of tubing and measuring a fitting thickness of at least a portion of a fitting. The method may next include determining a difference in thickness between the measured tubing thickness and the measured fitting thickness. The method may then include determining, based on the determined difference in thickness, an amount of fitting that is to be removed to reach a set, specified thickness that allows the fitting to be orbitally welded to the tubing in a fusion weld. The method may next include beveling an end portion of the fitting according to the determined amount of fitting that is to be removed to reach the specified thickness. The method of manufacturing may then include orbitally welding the beveled end of the fitting to the tubing in a fusion socket weld.

In some embodiments, the method of manufacturing may further include machining the end portion of the fitting to provide a landing, where the landing includes both the bevel and a squared tip portion of the landing. In some cases, both the bevel and the squared tip portion of the landing may be machined simultaneously.

In some examples, the orbital welding may be performed on the landing portion of the fitting that includes both the bevel and the squared tip portion. In some cases, the landing portion of the fitting may be machined to a specified length. In some embodiments, the length of the landing may be dependent on the amount of the fitting that is to be removed. In some cases, the end portion of the fitting is beveled at a specified degree of bevel. In some examples, the specified degree of bevel may be dependent on the amount of the fitting that is to be removed. In some embodiments, the end portion of the fitting may be beveled according to a specified beveling shape. In some cases, the shape of bevel may be dependent on the amount of the fitting that is to be removed. Moreover, in some cases, the tubing and the fitting may be manufactured using copper.

In another embodiment, a system may be provided. The system may include one or more sensors configured to measure a tubing thickness of at least a portion of tubing and measure a fitting thickness of at least a portion of a fitting. The system may also include one or more processors configured to: determine a difference in thickness between the measured tubing thickness and the measured fitting thickness, and based on the determined difference in thickness, determine an amount of fitting that is to be removed to reach a set, specified thickness that allows the fitting to be orbitally welded to the tubing in a fusion weld. The system may further include a facing tool configured to bevel an end portion of the fitting according to the determined amount of fitting that is to be removed to reach the specified thickness. The system may also include an orbital welder configured to orbitally weld the beveled end of the fitting to the tubing in a fusion socket weld.

In some examples, the sensors may be optical sensors. In some cases, the sensors may be mechanical measuring devices. In some cases, the facing tool may be further configured to machine the end portion of the fitting to provide a landing, where the landing includes both the bevel and a squared tip portion of the landing. In some embodiments, both the bevel and the squared tip portion of the landing are machined simultaneously.

In some cases, the orbital welding may be performed on the landing portion of the fitting that includes both the bevel and the squared tip portion. In some cases, the landing portion of the fitting may be machined to a specified length. In some examples, the length of the landing may be dependent on the amount of the fitting that is to be removed. In some embodiments, the end portion of the fitting may be beveled at a specified degree of bevel. In some cases, the specified degree of bevel may be dependent on the amount of the fitting that is to be removed.

In another embodiment, an apparatus is provided that includes one or more sensors or mechanical measuring devices configured to measure a tubing thickness of at least a portion of tubing and measure a fitting thickness of at least a portion of a fitting. The apparatus also includes one or more processors configured to: determine a difference in thickness between the measured tubing thickness and the measured fitting thickness and, based on the determined difference in thickness, determine an amount of fitting that is to be removed to reach a set, specified thickness that allows the fitting to be orbitally welded to the tubing in a fusion weld. The apparatus also includes a facing tool configured to bevel an end portion of the fitting according to the determined amount of fitting that is to be removed to reach the specified thickness, and an orbital welder configured to orbitally weld the beveled end of the fitting to the tubing in a fusion socket weld.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
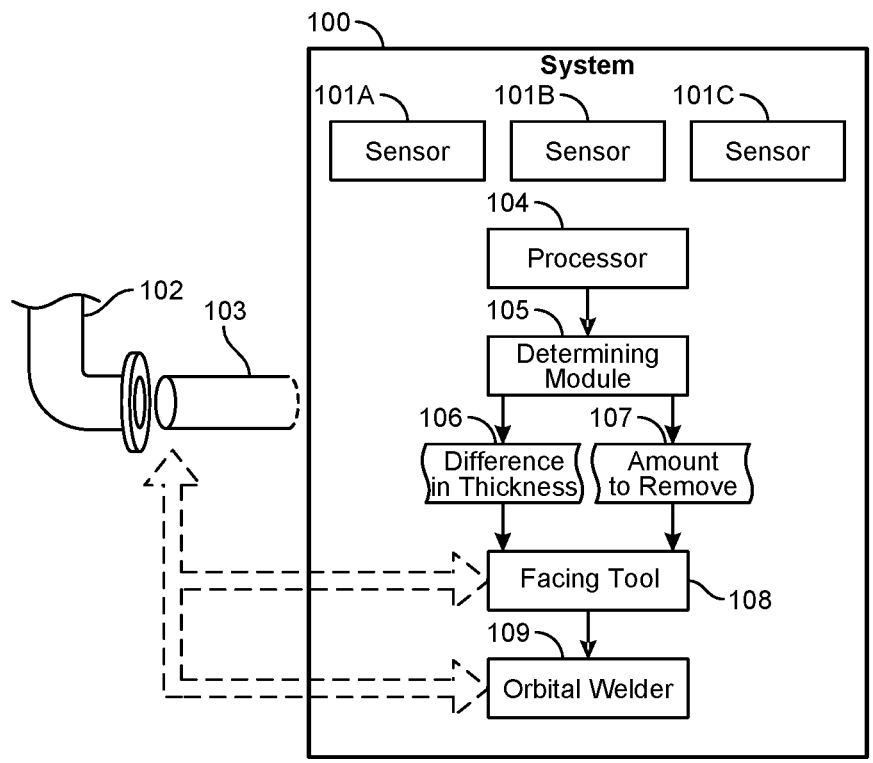
FIG. 1 illustrates a system in which one or more of the embodiments described herein may operate.

The embodiments described herein are directed to methods and systems for providing improved fittings for orbitally welded fusion bonds. As noted above, fittings are typically cast or extruded with high tolerances for variation in wall thickness. As such, each fitting may have vastly different thicknesses in the outer walls that are ultimately welded to sections of tubing. In traditional scenarios, this variation in thickness is not a problem; rather it is beneficial in that it provides an annular gap that is then filled with a filler material used when welding. Accordingly, in conventional systems, the variation in thickness is not a problematic issue and may even be considered to be an advantage in that it provides a gap that can then be filled with the filler material used in brazing or welding.

However, in contrast to these conventional systems, the embodiments described herein may provide improved fittings that allow for the welding of a copper tubing to a copper fitting in a fusion bond (i.e., a bond created without filler material). The fittings described herein may be manufactured and prepared in such a way that a section of tubing may be orbitally welded, in a fusion bond, to these specially manufactured fittings, even when the tubing and fittings are made of copper. Those skilled in the art will recognize that welding copper tubing to copper fittings is extremely difficult, and cannot be done with any type of consistently or reliability. Copper is an excellent conductor of heat and electricity. As such, copper does not behave the same as other metals that may be orbitally welded.

For instance, if copper tubing is being orbitally welded, in a fusion bond (that does not use filler material), the amount of heat applied during the weld must be very precise. As such, a precise arc length must be maintained between the orbital weld head and the fitting. If there are any variations in the thickness of the fitting wall, these variations may lead to a juncture that is too hot (in which case, the copper will melt), or is too cold (in which case the copper of the tubing will not fuse to the copper of the fitting). Accordingly, the orbital welding of copper tubing to copper fittings is particularly problematic and, using traditional fittings (e.g., socket type fittings), cannot be performed with any measure of consistency that would allow for widespread adoption in industry.

The embodiments described herein may be configured to manufacture and/or machine fittings in a manner that allows the fittings to be orbitally welded, in a fusion bond that does not require filler material, to sections of tubing (in particular, copper tubing, although many other types of metals and metal alloys may be welded or brazed using the systems and methods herein). Indeed, the systems herein may provide fittings made of copper that are capable of being orbitally welded in a fusion bond to sections of copper tubing. Copper tubing, as will be understood, is created from large strips that are rolled to a very precise thickness. The copper tubing will typically have very low tolerances (e.g., 1-5 thousandths of an inch), and as such, may provide a consistent and reliable thickness when creating orbitally welded fusion bonds.

Fittings, on the other hand, are typically manufactured in a casting, forging, or hydraulic extrusion process that leads to large variations in wall thickness (e.g., 30-60 thousandths of an inch). This variation may lead to poor fusion bonds, as the annular gaps between the fittings and the tubing may be too large for fusion welds to work properly. The embodiments herein may be configured to provide a fitting that has a precise beveling on an end portion thereof. This end portion may be the location or juncture where the fitting is orbitally welded to the tubing. The beveling may be created in a specific shape, or at a specific degree that provides a reliable, consistent thickness of the fitting wall.

During this shaping or beveling process, the outer diameter of the fitting may also be more rounded to match the shape of the low tolerance tubing. This shaping or rounding of the outer diameter of the fitting may remove some or, in some cases, all of the annular space between the fitting and the tubing. This removal of annular space between the fitting and the tubing may be additionally beneficial when providing surfaces that allow for consistent orbitally welded fusion bonds to be created by an orbital welder. Moreover, the precise beveling shape and/or degree may be dependent on the amount of material that is to be removed from the fitting in order to facilitate the orbitally welded fusion bond. This precise, customized beveling degree and/or shape may allow a controlled amount of heat to transfer from the weld head of the orbital welder to the fitting and to the tubing. In this manner, a section of copper tubing may be orbitally welded, in a fusion bond, to a specially prepared copper fitting in a consistent and reliable manner that provides enough consistency for widespread adoption in industry, which to this date, has not been achieved.

Figure 2:
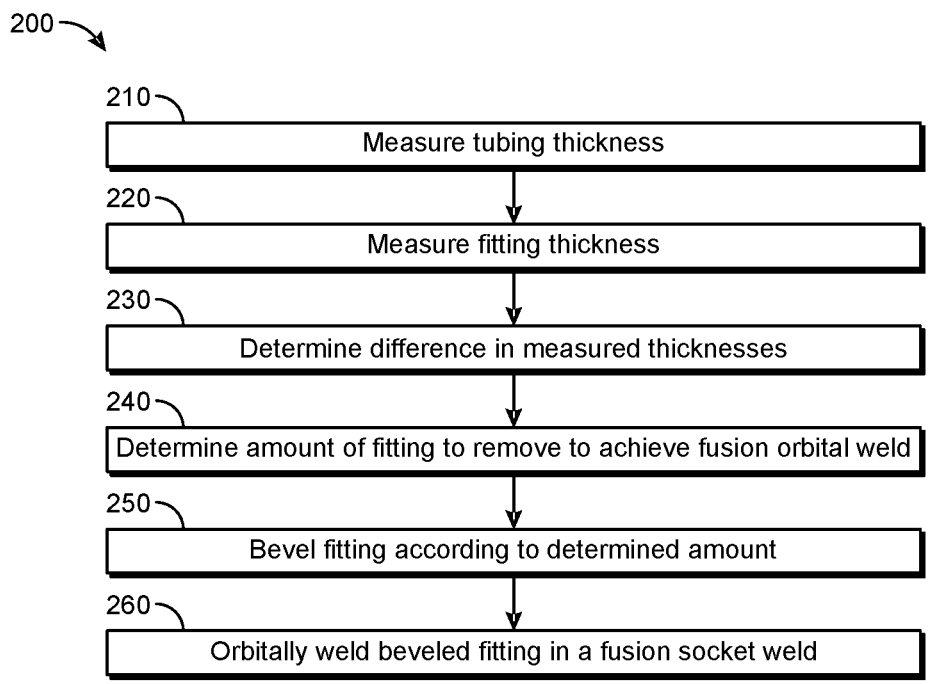
FIG. 2 illustrates a flowchart of an example method for manufacturing fittings configured for orbitally welded fusion bonds.

In view of the systems and architectures described above, methodologies that may be implemented in accordance with the disclosed subject matter will be better appreciated with reference to the system 100 of FIG. 1 and the flow chart 200 of FIG. 2. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 1 illustrates a system 100 that includes various components including sensors 101A, 101B, and 101C. These sensors may be substantially any type of sensors, including image sensing devices capable of detecting or measuring the thickness of a fitting and/or a section of tubing. In some cases, as illustrated in method 200 of FIG. 2, one or more of the sensors 101A-101C may be configured to measure the tubing thickness of a section of tubing 103 (step 210). Moreover, one or more of the sensors 101A-101C may be configured to measure a thickness of a section of a fitting 102 (step 220). While a 90-degree elbow fitting is illustrated in FIG. 1, it will be understood that the fitting 102 may be substantially any type of fitting that is configured to interface with tubing in a socket joint.

The system 100 may also include a processor 104 that includes or is configured to communicate with a determining module 105. The determining module may be configured to receive sensor inputs (e.g., from sensors 101A-101C) and determine a difference in the measured thickness of the fitting 102 and the tubing 103 (step 230). Then, based on this difference in measured thickness, the determining module may determine an amount of fitting 102 that is to be removed to reach a set, specified thickness (step 240). This set, specified thickness may be a thickness of a fitting (e.g., a copper fitting) that, when combined with the thickness of the tubing, allows the fitting to be orbitally welded to the tubing in a fusion weld. As such, using the determined thickness, the orbital welder 109 may weld the fitting 102 to the tubing 103 in a fusion weld (without filler material) in a reliable and consistent manner. At step 250, the facing tool 108 of system 100 may bevel an end portion of the fitting 102 according to the determined amount of fitting that is to be removed to reach the specified thickness. And, at step 260, once the fitting 102 has been beveled in the determined manner, the orbital welder 109 may orbitally weld the beveled end of the fitting 102 to the tubing 103 in a fusion socket weld.

Figure 3:
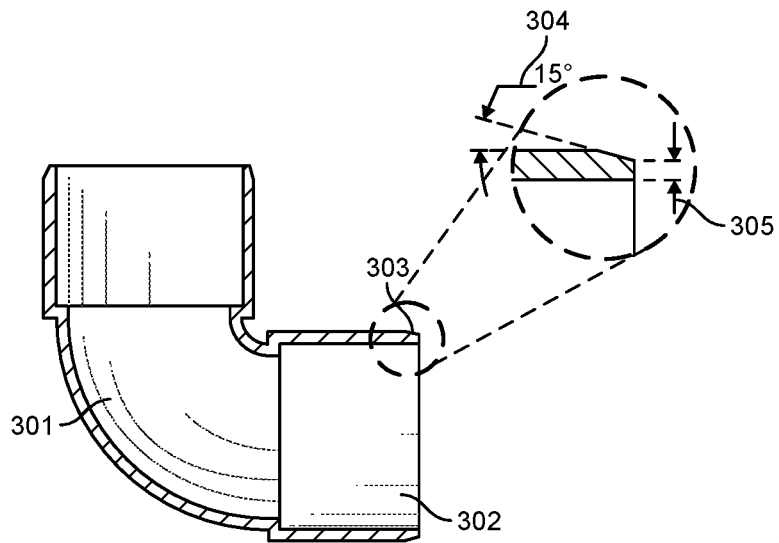
FIG. 3 illustrates an embodiment of a fitting configured for orbitally welded fusion bonds.

In some embodiments, the facing tool 108 may be configured to machine the end portion of a fitting to provide a landing. This landing may include both the bevel and a squared tip portion of the landing. The landing may also provide additional shaping or rounding to match the rounding of the tubing, thereby reducing or eliminating the annular gap between the fitting and the tubing. For instance, as shown in FIG. 3, the end portion 302 of the fitting 301 may be machined by the facing tool 108 to include a bevel 304 (15 degrees in this case) and a flat, squared tip portion 305 that may have a specified thickness (e.g., 0.027"). In some cases, both the bevel 304 and the squared tip portion 305 of the landing 303 may be machined simultaneously by the facing tool 108. As will be explained further below, the type of bevel may be one of many different possible bevel types, including a J-groove, a square, a U-groove, or other type of bevel. Moreover, the degree of the bevel may vary and may be anywhere from anywhere above zero degrees and anywhere below 90 degrees. As will be explained in greater detail below, the degree of the bevel and/or the type of bevel may vary depending on the measured thicknesses of the fitting 102 and/or the tubing 103.

Figure 4:
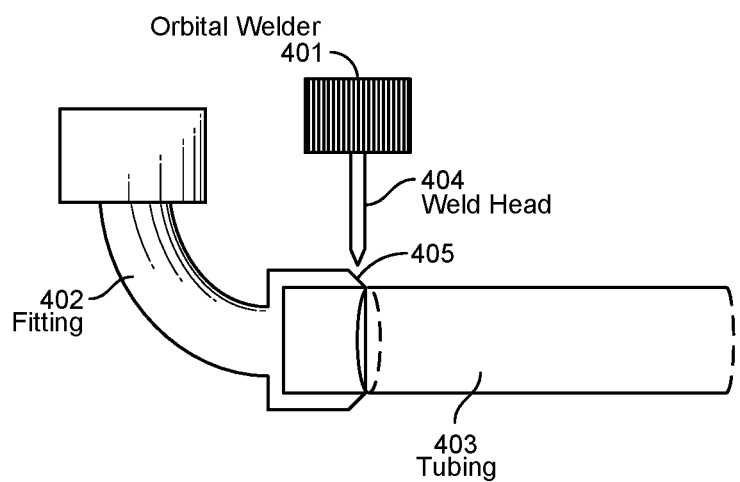
FIG. 4 illustrates an embodiment of a weld head of an orbital welder being applied to a prepared landing on a fitting.

After the fitting 301 has been beveled, squared, and shaped, the orbital welder 109 of FIG. 1 may orbitally weld the tubing 103 to the fitting 102 in a fusion bond. As shown in FIG. 4, the orbital welder 401 may apply the weld head 404 to the beveled and squared landing portion 405 of the fitting 402. Thus, the orbital welder 401 may, using sensor information, identify where the landing has been created on the fitting 402. The orbital welder's controller (or processor 104) may then direct the orbital weld head 404 to a position directly above the landing area that includes both the bevel and the squared tip portion. The orbital welder 401 may then orbitally weld the tubing 403 to the fitting 402 in a fusion bond, without filler material.

In some cases, the tubing 403 and the fitting 402 may be made of copper. Because copper is such a good conductor of heat, the placement of the weld head 404 may need to be controlled very tightly to maintain a consistent arc length. Moreover, as explained above, the thickness of the fitting may also be beveled or machined in a controlled manner to provide a landing 405 that conducts enough heat and electricity from the weld head 404 to fuse the tubing 403 to the fitting 402 in a fusion bond without filler material, but does not conduct so much heat and electricity that the weld blows through the fitting 402 and/or the tubing 403. Accordingly, the weld head 404 may be placed in a precise location relative to the beveled landing 405 of the fitting 402, and the fitting may be beveled in a precise, determined manner that will channel the heat of the weld head 404 and fuse the copper fitting to the copper tubing without blowing them out.

Figure 5A:
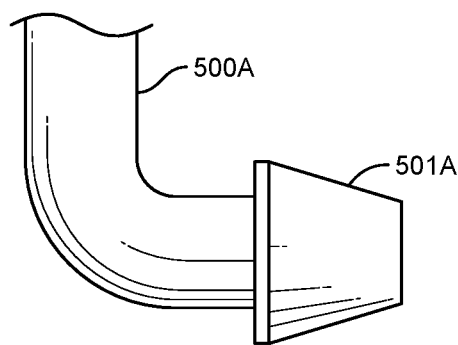
FIG. 5A-5C illustrate embodiments of a landing with different taper lengths.
Figure 5B:
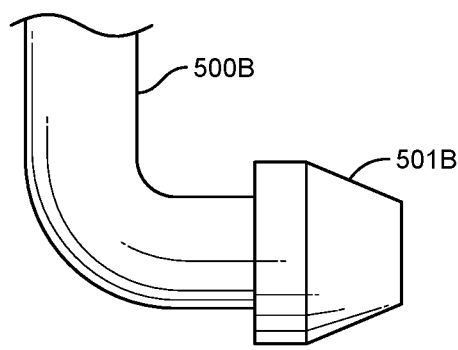
Figure 5C:
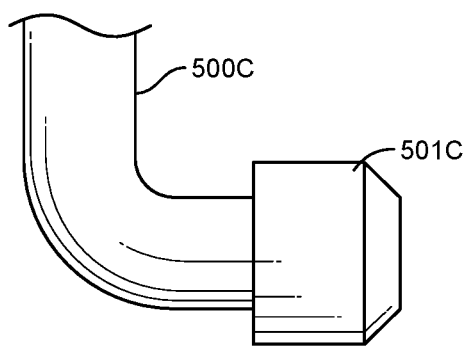

Finding the appropriate length of the bevel for the landing 405 is not trivial. Moreover, finding the appropriate bevel type for the landing 405 is not trivial. This is especially true in embodiments where copper tubing is being orbitally welded or brazed, in a fusion bond, to a copper fitting. In some cases, the landing portion of the fitting may be machined to a determined length. The length of the landing, at least in some cases, is dependent on the amount of the fitting that is to be removed. If more of the fitting is to be removed so that the fusion bond will work, the bevel of the landing will be at a smaller angle or smaller degree, and the landing will be longer (see, for example, landing 501A on fitting 500A of FIG. 5A). In cases where less of the fitting is to be removed so that the fusion bond will fuse as desired, the bevel of the landing will be at a higher angle and will be shorter (see, for example, landing 501B on fitting 500B of FIG. 5B). And, in cases where more of the fitting is to be removed so that the fusion bond will fuse as desired, the bevel of the landing will be at a much higher angle and will be much shorter (see, for example, landing 501C on fitting 500C of FIG. 5C). Thus, based on measurements indicating the thickness of the tubing and the fitting, the landing of the fitting may be beveled at a degree appropriate to remove enough of the fitting to allow the fitting to be fusion bonded to the tubing. Accordingly, the degree of the bevel applied may be dependent on the amount of the fitting that is to be removed.

Figure 6A:
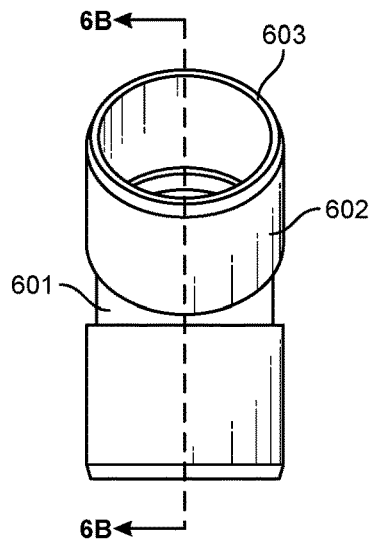
FIGS. 6A-6C illustrate embodiments of various side and top views of a fitting having landings that are configured for orbitally welded fusion bonds.
Figure 6B:
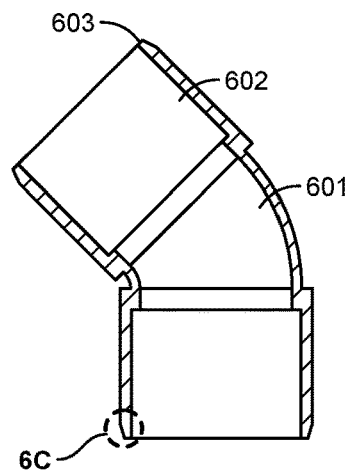
Figure 6C:
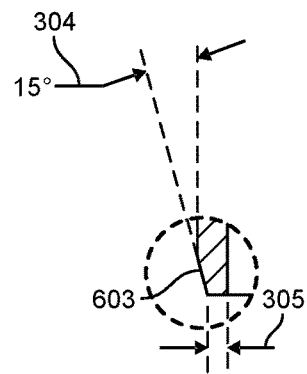

Additionally or alternatively, the end portion or landing of the fitting may be beveled according to a specified beveling shape. That shape may be a tapered bevel with a squared tip, as shown in FIGS. 6A-6C, for example. FIG. 6A illustrates an elbow joint fitting 601 with an end portion 602 into which a tube is inserted, and a landing area 603. The landing area 603 may include a bevel, as can be seen in FIGS. 6B and 6C. The embodiment shown in FIG. 6C indicates that the angle of the bevel 304 may be 15 degrees, and the length of the squared tip 305 may have a specified length (e.g., 0.025"). Both the length of the squared tip portion 305 and the angle of the bevel 304 may be determined based on how much of the fitting is to be removed to provide a landing that will fusion bond to the tubing. Moreover, at least in some cases, the type of bevel may depend on how much of the fitting is to be removed to provide a landing that will fusion bond to the tubing.

Figure 7A:
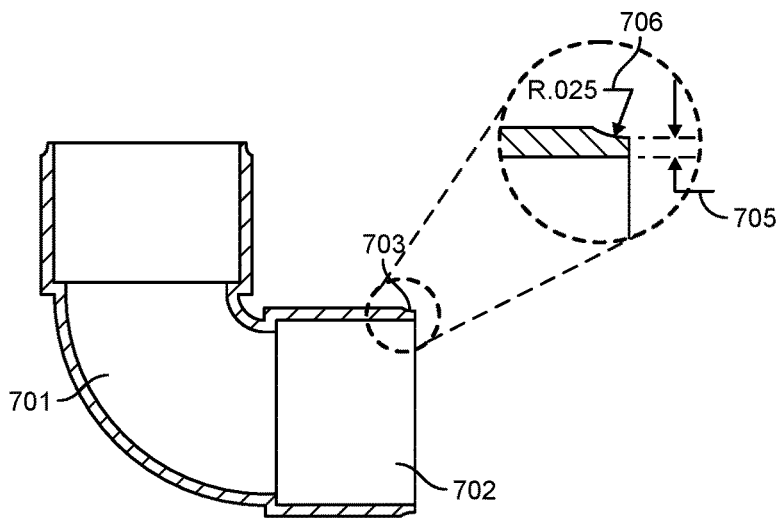
FIG. 7A-7E illustrate embodiments in which fitting landings may be provided in different bevel shapes.
Figure 7B:
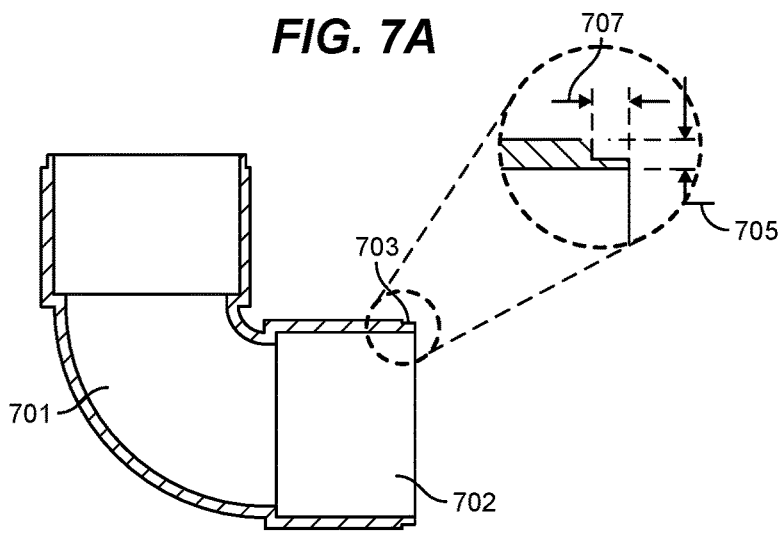
Figure 7C:
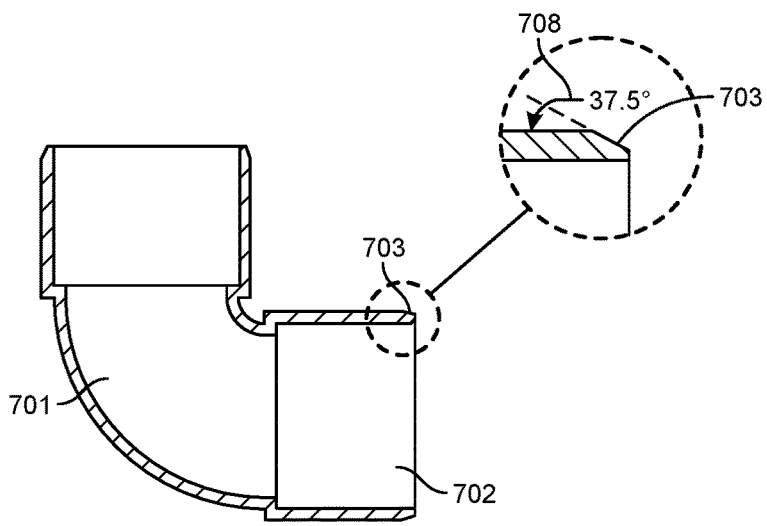
Figure 7D:
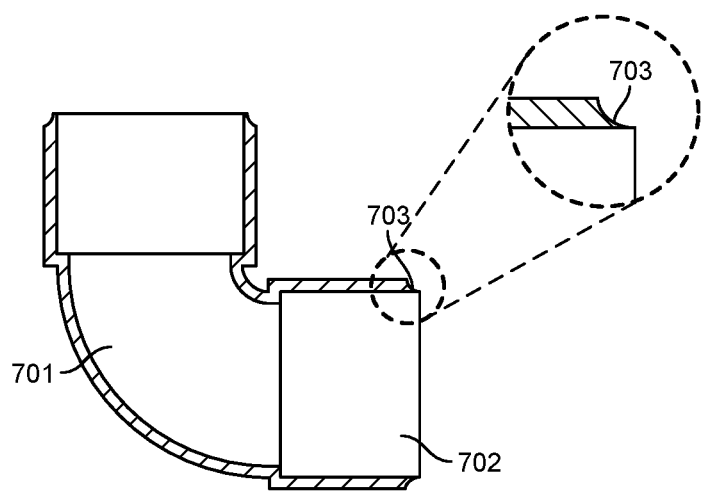
Figure 7E:
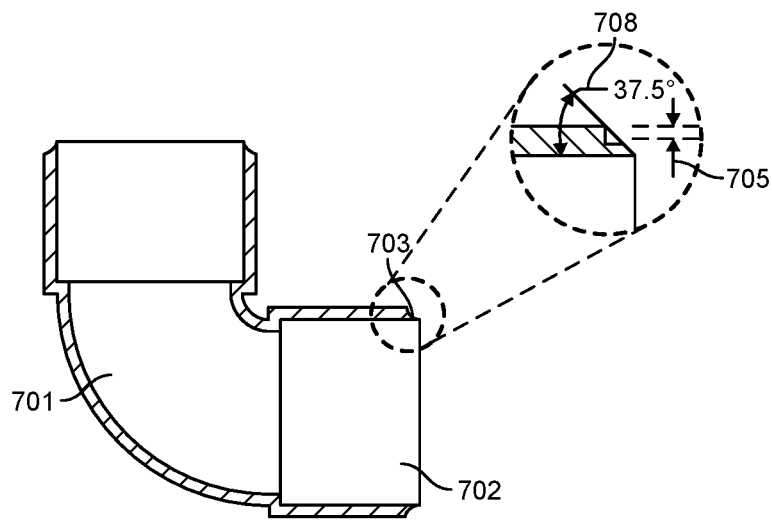

As shown in FIGS. 7A-7E, many different types of bevels may be used, including bevel types not shown in FIGS. 7A-7E. FIG. 7A illustrates a J-groove bevel, FIG. 7B illustrates a square groove, FIG. 7C illustrates a full bevel (e.g., at 37.5 degrees), FIG. 7D illustrates a U-groove bevel, and FIG. 7E illustrates a square plus bevel. In FIG. 7A, a fitting 701 may include an end potion 702 that is to be socket welded or brazed, in a fusion bond, to a section of tubing (not shown). The J-groove bevel of FIG. 7A may be selected, in some cases, when applying a bevel to the fitting 701. The J-groove may have variable curvature values 706 (e.g., R.025) and variable squared tip distances 705. The depth of the squared tip may be altered according to the measured thicknesses of the fitting 701 and the tubing. Similarly, the curvature values 706 of the J-groove may similarly vary, and more or less material may be removed in the landing 703 according to which curvature value is used.

The square bevel of FIG. 7B at landing 703 may similarly have variable distances including the squared tip distance 705 and the distance to which the square bevel is cut (e.g., 707). This distance 707 and/or the distance 705 may be configurable and controllable by the systems herein (e.g., processor 104 of FIG. 1). For example, the distances may be longer or shorter depending on how much of the fitting 701 is to be removed so that a reliable, consistent fusion bond can be created through orbital welding or brazing. Thus, not only may the shape of the bevel be dependent on the amount of the fitting that is to be removed, but the proportions of the shape, the curvature of the shape, and other characteristics of the shape of the bevel may change based on differences in thickness between the fitting and the tubing.

The full bevel 708 of FIG. 7C may taper toward the square faced tip of the landing 703 at a degree of 37.5 degrees (or some other angle). The taper may be at a constant angle relative to the fitting 701. In contrast, the U-groove bevel on the landing 703 of FIG. 7D may vary along a defined curve. That curve may be selected in cases where the thickness of the fitting will not lead to a reliable fusion bond between the fitting 701 and the tubing. In some cases, having a small amount of fitting wall at the square faced tip of the end portion 702 that gradually curves inward and upward, incorporating more fitting material, may lead to a stronger fusion bond that is strong enough to fusion bond the tubing to the fitting 701 without blowing through the tubing and/or the fitting with the heat of the weld. This is especially true for copper fittings and copper tubing. Still further, some embodiments may implement a square plus bevel as shown in FIG. 7E. This may have a general bevel angle of 37.5 degrees (708), with a square bevel that occurs along the taper of the general bevel. The square bevel may have a specified depth and height 705. This combined square plus bevel of FIG. 7E may be implemented in cases where other bevels may improperly bond the tubing to the fitting.

In some embodiments, a corresponding system may be provided. The system may include, as shown in FIG. 1, one or more sensors 101A-101C configured to measure a tubing thickness of at least a portion of tubing 103 and measure a fitting thickness of at least a portion of a fitting 102. The system may also include one or more processors 104 configured to: determine a difference in thickness 106 between the measured tubing thickness and the measured fitting thickness, and based on the determined difference in thickness, determine an amount of fitting 107 that is to be removed to reach a set, specified thickness that allows the fitting 102 to be orbitally welded to the tubing 103 in a fusion weld. The system may further include a facing tool 108 configured to bevel an end portion of the fitting 102 according to the determined amount of fitting 107 that is to be removed to reach the specified thickness. The system may also include an orbital welder 109 configured to orbitally weld the beveled end of the fitting to the tubing in a fusion socket weld. The orbital welder 109 may be a tungsten inert gas (TIG) welder or other type of gas tungsten arc welder (GTAW).

In some cases, the sensors 101A-101C may be optical sensors, and may provide inputs that the processor may use to determine thickness. Alternatively, the sensors may be electrodes or other sensors capable of detecting the thickness of a fitting or a section of tubing. The facing tool 108 may be any type of industrial machining equipment that is configured to machine an end portion of a fitting to provide a landing, which includes both the bevel and the squared tip portion of the landing. In some cases, both the bevel and the squared tip portion of the landing may be machined simultaneously by the facing tool 108. After the fitting has been machined, the orbital welder 109 of system 100 may orbitally weld the fitting to the tubing on the landing portion of the fitting that includes both the bevel and the squared tip portion. As noted above, the landing portion of the fitting may be machined to a specified length and may have a specific shape or type of bevel. In some cases, the length and/or type of the bevel in the landing may be dependent on the amount of the fitting that is to be removed to provide an appropriately formed fusion bond between the fitting and the tubing.

Figure 8A:
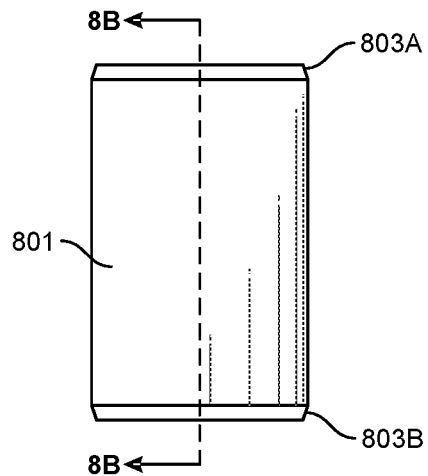
FIG. 8A-8C illustrate embodiments of fitting landings in a full coupling that may be configured for orbitally welded fusion bonds.
Figure 8B:
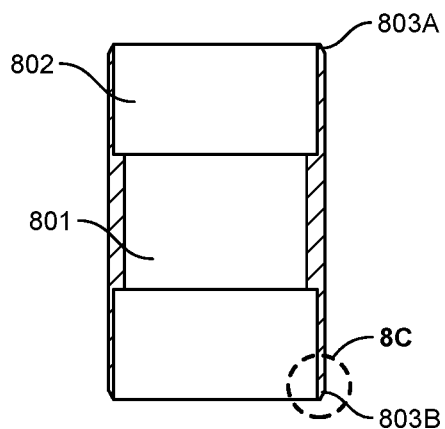
Figure 8C:
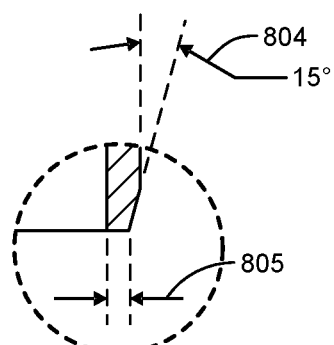

In some embodiments, the system 100 of FIG. 1 may be implemented to manufacture, assemble, generate, or otherwise provide fittings (especially copper fittings) that may be orbitally welded, in a fusion weld, to a section of tubing (especially copper tubing), including the fittings illustrated in FIGS. 8A-8C, FIGS. 9A-9C and FIGS. 10A-10C. FIGS. 8A-8C illustrate a fitting 801 that has two landings, 803A and 803B. Each of these landings 803A/803B may have its own bevel type and bevel angle. Each end portion may be separately measured and separately analyzed to determine the amount of the fitting that is to be removed and, as a result which type of bevel is to be used and/or what angle or at which proportions the bevel is to be created. As noted in FIG. 8C, the angle of the bevel 804 may be 15 degrees or some other whole or decimal number above 0 degrees and below 90 degrees. Moreover, the height of the squaring 805 may also be determined and implemented based on the thickness measurements of the fitting 801.

Figure 9A:
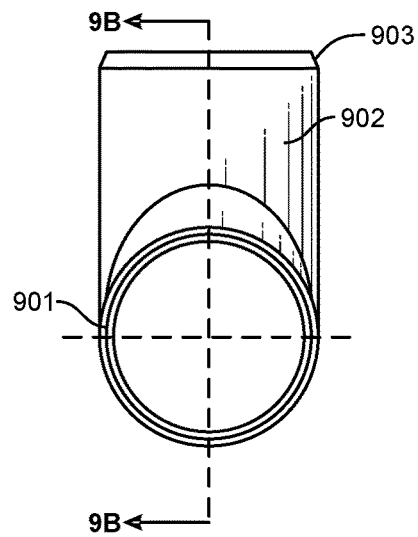
FIG. 9A-9C illustrate embodiments of fitting landings in a tee coupling that may be configured for orbitally welded fusion bonds.
Figure 9B:
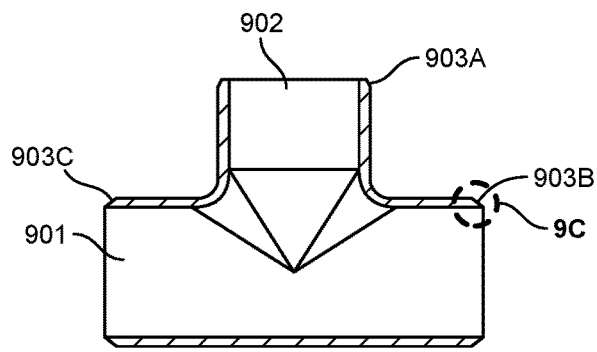
Figure 9C:
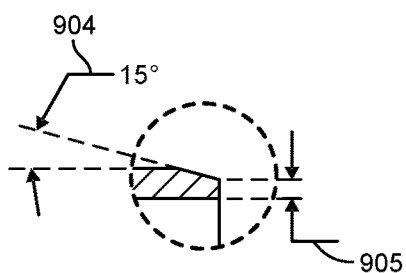
Figure 10A:
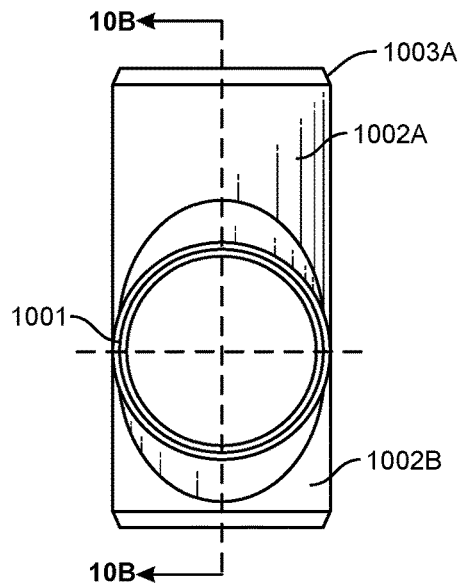
FIG. 10A-10C illustrate embodiments of fitting landings in a cross coupling that may be configured for orbitally welded fusion bonds.
Figure 10B:
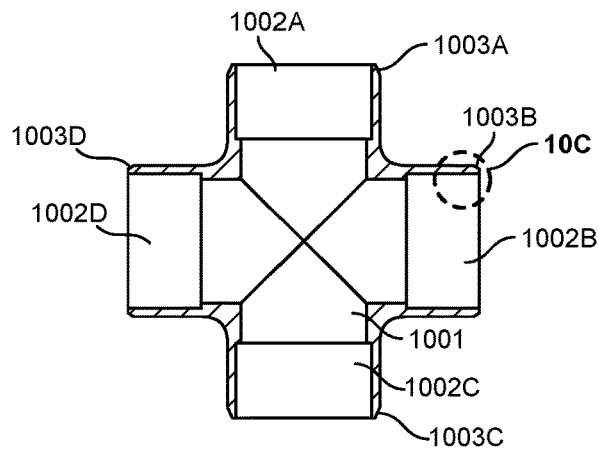
Figure 10C:
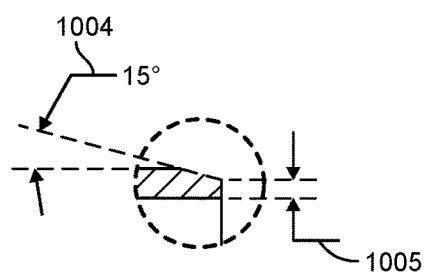

Similar principles and concepts apply to the tee junction fitting 901 of FIGS. 9A-9C, and the cross junction fitting 1001 of FIGS. 10A-10C. In FIGS. 9A-9C, the fitting 901 may have three end portions (e.g., 902) with three different landings (903), 903A, 903B, and 903C. As above, the system 100 may separately measure and prepare each of these landings independently. In some cases, the landings may all share the same bevel type, and in other cases, the landings 903A-903C may each have a different bevel type. Moreover, in some examples, the landings 903A-903C may each have the same bevel angle 904, while in other examples, the landings may each have a different bevel angle. The fitting preparation for each end portion may be different based on which bevel type and/or bevel angle will be optimal for and will allow a properly fused orbital weld at each landing. The height of the squaring 905 may also be the same or unique for each landing 903A-903C.

In FIGS. 10A-10C, the cross junction fitting 1001 may have four end portions with four different landings 1003A, 1003B, 1003C, and 1003D. As with FIGS. 9A-9C, the system 100 of FIG. 1 may separately measure and prepare each of these four landings independently. In some embodiments, the landings 1003A-1003D may all share the same bevel type, and in other cases, the landings may each have a different bevel type. Moreover, in some embodiments, the landings 1003A-1003D may each have the same bevel angle 1004, while in other examples, the landings may each have a different bevel angle. The system 100 of FIG. 1 may prepare each end portion of the fitting (e.g., 1002A-1002D) in a different manner based on which bevel type and/or bevel angle will provide a properly fused orbital weld at each landing. Moreover, as above, the height of the squaring 1005 may also be the same or unique for each landing 1003A-1003D.

The embodiments herein may also provide a corresponding apparatus. The apparatus may include one or more sensors configured to measure a tubing thickness of at least a portion of tubing and measure a fitting thickness of at least a portion of a fitting. The apparatus may also include one or more processors configured to: determine a difference in thickness between the measured tubing thickness and the measured fitting thickness and, based on the determined difference in thickness, determine an amount of fitting that is to be removed to reach a set, specified thickness that allows the fitting to be orbitally welded to the tubing in a fusion weld. Still further, the apparatus may include a facing tool configured to bevel an end portion of the fitting according to the determined amount of fitting that is to be removed to reach the specified thickness. The apparatus may also include an orbital welder configured to orbitally weld the beveled end of the fitting to the tubing in a fusion socket weld.

The embodiments described herein may thus provide a socket fitting with a modified end portion. The landing may be beveled at a set number of degrees and may be squared at the end of the bevel. This beveling and squaring allows the wall thickness of the fitting to vary (e.g., 50-60 thousandths) and still provide a landing area with a consistent wall thickness where the (tungsten) weld head lines up. Then, when the orbital welder is initiated and the amperage is applied, the fusion bond will be reliably and correctly formed. Absent these changes to the fitting, the large variation in wall thickness in fittings will cause the orbital weld to fail.

FIG. 1, as noted above, illustrates a processor 104 for receiving and processing sensor data, and controlling the facing tool 108, the orbital welder 109, and potentially other tools. The processor 104 may be part of a computer system, including a local computer system or a distributed (e.g., cloud) computer system. The processor 104 may include a determining module 105 and potentially some system memory. The processor 104 may include program modules for performing a variety of different functions. The program modules may be hardware-based, software-based, or may include a combination of hardware and software. Each program module may use computing hardware and/or software to perform specified functions, including controlling the steps 210-260 of the method of manufacturing 200 of FIG. 2.

It will be further understood that the embodiments described herein, including the methods of manufacturing, may implement various types of computing systems that interact with various types of sensors. These computing systems are now increasingly taking a wide variety of forms. Computing systems may, for example, be handheld devices such as smartphones or feature phones, appliances, laptop computers, wearable devices, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

Computing systems typically include at least one processing unit and memory. The memory may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory of the computing system. Computing system may also contain communication channels that allow the computing system to communicate with other message processors over a wired or wireless network.

Embodiments described herein may comprise or utilize a special-purpose or general-purpose computer system that includes computer hardware, such as, for example, one or more processors and system memory, as discussed in greater detail below. The system memory may be included within the overall memory. The system memory may also be referred to as "main memory", and includes memory locations that are addressable by the at least one processing unit over a memory bus in which case the address location is asserted on the memory bus itself. System memory has been traditionally volatile, but the principles described herein also apply in circumstances in which the system memory is partially, or even fully, non-volatile.

Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the disclosure can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the embodiments herein.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The embodiments herein may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the present disclosure may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A method of manufacturing comprising:
measuring a tubing thickness of at least a portion of tubing;
measuring a fitting thickness of at least a portion of a fitting;
determining a difference in thickness between the measured tubing thickness and the measured fitting thickness;
based on the determined difference in thickness, determining an amount of fitting that is to be removed in a beveling process to reach a set, specified thickness that allows the fitting to be orbitally welded to the tubing in a fusion weld, wherein higher determined differences in thickness result in longer bevels, and wherein lower determined differences in thickness result in shorter bevels;

beveling an end portion of the fitting according to the determined amount of fitting that is to be removed to reach the specified thickness; and orbitally welding the beveled end of the fitting to the tubing in a fusion socket weld.

2. The method of manufacturing of claim 1, further comprising machining and shaping the end portion of the fitting to provide a landing, the landing including the bevel, a rounded shaping, and a squared tip portion of the landing.

3. The method of manufacturing of claim 2, wherein both the bevel and the squared tip portion of the landing are machined simultaneously.

4. The method of manufacturing of claim 2, wherein the orbital welding is performed on the landing of the fitting that includes both the bevel and the squared tip portion.

5. The method of manufacturing of claim 2, wherein the landing of the fitting is machined to a specified length.

6. The method of manufacturing of claim 5, wherein the length of the landing is dependent on the amount of the fitting that is to be removed.

7. The method of manufacturing of claim 1, wherein the end portion of the fitting is beveled at a specified degree of bevel.

8. The method of manufacturing of claim 7, wherein the specified degree of bevel is dependent on the amount of the fitting that is to be removed.

9. The method of manufacturing of claim 1, wherein the end portion of the fitting is beveled according to a specified beveling shape.

10. The method of manufacturing of claim 9, wherein the shape of bevel is dependent on the amount of the fitting that is to be removed.

11. The method of manufacturing of claim 1, wherein the tubing and the fitting are manufactured using copper.

12. A system, comprising:
one or more sensors configured to measure a tubing thickness of at least a portion of tubing and measure a fitting thickness of at least a portion of a fitting;
one or more processors configured to:
determine a difference in thickness between the measured tubing thickness and the measured fitting thickness; and
based on the determined difference in thickness, determine an amount of fitting that is to be removed in a beveling process to reach a set, specified thickness that allows the fitting to be orbitally welded to the tubing in a fusion weld, wherein higher determined differences in thickness results in longer bevels, and wherein lower determined differences in thickness result in shorter bevels;
a facing tool configured to bevel an end portion of the fitting according to the determined amount of fitting that is to be removed to reach the specified thickness; and
an orbital welder configured to orbitally weld the beveled end of the fitting to the tubing in a fusion socket weld.

13. The system of claim 12, wherein the one or more sensors comprise optical sensors.

14. The system of claim 12, wherein the facing tool is further configured to machine the end portion of the fitting to provide a landing, the landing including both the bevel and a squared tip portion of the landing.

15. The system of claim 14, wherein both the bevel and the squared tip portion of the landing are machined simultaneously.

16. The system of claim 14, wherein the orbital welding is performed on the landing portion of the fitting that includes both the bevel and the squared tip portion.

17. The system of claim 14, wherein the landing portion of the fitting is machined to a specified length.

18. The system of claim 17, wherein the length of the landing is dependent on the amount of the fitting that is to be removed.

19. The system of claim 12, wherein the end portion of the fitting is beveled at a specified degree of bevel, and wherein the specified degree of bevel is dependent on the amount of the fitting that is to be removed.

20. An apparatus, comprising:
one or more sensors configured to measure a tubing thickness of at least a portion of tubing and measure a fitting thickness of at least a portion of a fitting;
one or more processors configured to:
determine a difference in thickness between the measured tubing thickness and the measured fitting thickness; and
based on the determined difference in thickness, determine an amount of fitting that is to be removed in a beveling process to reach a set, specified thickness that allows the fitting to be orbitally welded to the tubing in a fusion weld, wherein higher determined differences in thickness results in longer bevels, and wherein lower determined differences in thickness result in shorter bevels; a facing tool configured to bevel an end portion of the fitting according to the determined amount of fitting that is to be removed to reach the specified thickness; and
an orbital welder configured to orbitally weld the beveled end of the fitting to the tubing in a fusion socket weld.

* * * * *